United States Patent
Fu et al.

(10) Patent No.: US 9,770,675 B2
(45) Date of Patent: Sep. 26, 2017

(54) MICROFLUIDIC CHIP FOR STEAM DISTILLATION

(71) Applicant: NATIONAL PINGTUNG UNIVERSITY OF SCIENCE & TECHNOLOGY, Pingtung County (TW)

(72) Inventors: Lung-Ming Fu, Pingtung County (TW); Chin-Pin Chang Chien, Pingtung County (TW)

(73) Assignee: National Pingtung University of Science & Technology, Pingtung County (TW)

( * ) Notice: Subject to any disclaimer, the term of this patent is extended or adjusted under 35 U.S.C. 154(b) by 475 days.

(21) Appl. No.: 14/487,173

(22) Filed: Sep. 16, 2014

(65) Prior Publication Data
US 2015/0209687 A1 Jul. 30, 2015

(30) Foreign Application Priority Data
Jan. 29, 2014 (TW) .............................. 103103358 A

(51) Int. Cl.
*B01D 3/38* (2006.01)
*B01D 3/14* (2006.01)
*B01D 3/34* (2006.01)

(52) U.S. Cl.
CPC ...................................... *B01D 3/38* (2013.01)

(58) Field of Classification Search
CPC ............... B01D 3/14; B01D 3/34; B01D 3/38
See application file for complete search history.

(56) References Cited

U.S. PATENT DOCUMENTS

2010/0247429 A1* 9/2010 Ohsaki et al. ......... A61K 51/00
424/1.11

* cited by examiner

*Primary Examiner* — Brian McCaig
(74) *Attorney, Agent, or Firm* — Alan D. Kamrath; Kamrath IP Lawfirm, P.A.

(57) ABSTRACT

A microfluidic chip for steam distillation includes a chip body and a condenser. The chip body includes a steam inlet and a steam outlet. The steam inlet is connected to the steam outlet by a micro channel. The micro channel includes a first channel, a second channel, and a receiving space having an enlarged cross sectional area larger than a cross sectional area of each of the first and second channels. The first channel connects the steam inlet with the receiving space. The second channel windingly connects the steam outlet with the receiving space. The condenser includes a condensing channel inlet and a condensing channel outlet. The condenser further includes a condensing channel windingly connecting the condensing channel inlet with the condensing channel outlet. The steam outlet 11b intercommunicates with the condensing channel inlet.

6 Claims, 5 Drawing Sheets

MICROFLUIDIC CHIP FOR STEAM DISTILLATION

BACKGROUND OF THE INVENTION

1. Field of the Invention

The present invention relates to a microfluidic chip for steam distillation and, more particularly, to a microfluidic chip for steam distillation useful in analyzing micro sample solutions.

2. Description of the Related Art

Methanol (HCHO) is a colorless, soluble gas that can be absorbed by a human body via the respiratory tract. It turns into formalin (the concentration is about 30-40%) when it dissolves in water and can be absorbed by the human body via the gastrointestinal tract.

Since methanol provides functions including bleaching, enhancing coagulation of protein, and preserving freshness, many unscrupulous businessmen maliciously added methanol into foods. After absorption by the human body, methanol will combine with the amino terminal of protein and cause denaturation of protein, damaging normal functions of the cells of the human body. Thus, detection of methanol in foods is an inevitable process for assuring food safety.

Steam distillation is one of the methods for separating a liquid from a solid and is suitable to extract volatile ingredients that can not be damaged by high temperature steam, that do not react with water, and that are difficult to dissolve in water or insoluble to water. Thus, current detection of methanol content in foods includes extraction of methanol by steam distillation and subsequent calculation of the methanol content by titration of sodium thiosulfate solution.

FIG. 1 shows a conventional steam distillation device 9 including a steam generating flask 91, a sample flask 92, and a condenser 93. The steam distillation device 9 further includes a steam guiding tube 94 and a sample guiding tube 95. The steam guiding tube 94 is connected to the steam generating flask 91 and the sample flask 92. The sample guiding tube 95 is connected to the sample flask 92 and the condenser 93. The steam generating flask 91 generates high temperature steam that flows through the steam guiding tube 94 into the sample flask 92 receiving a sample solution S. A volatile substance (such as methanol) contained in the sample solution S evaporates into a gaseous analyte. The gaseous analyte flows along the sample guiding tube 95 into the condenser 93 and condenses into a liquid analyte. Thus, the volatile substance (i.e., the liquid analyte) can be extracted from the sample solution S and can be detected to obtain its content.

However, the sample flask 92 used in the conventional steam distillation device 9 is generally a 250 mL conical bottle which is not suitable for receiving a difficult-to-obtain sample solution S of only about 0.2-0.5 g in a single use. Furthermore, assembly of the bulky condenser 93 is required, leading to a bulky steam distillation device 9 as well as difficulties in storage.

SUMMARY OF THE INVENTION

An objective of the present invention is to provide a microfluidic chip for steam distillation capable of reducing the amount of a sample solution to be detected and, thus, suitable for sample solutions that are difficult to obtain.

Another objective of the present invention is to provide a microfluidic chip for steam distillation that has a small volume allowing easy storage.

The present invention fulfills the above objectives by providing a microfluidic chip for steam distillation including a chip body and a condenser. The chip body includes a steam inlet and a steam outlet. The steam inlet is connected to the steam outlet by a micro channel. The micro channel includes a first channel, a second channel, and a receiving space having an enlarged cross sectional area larger than a cross sectional area of each of the first and second channels. The first channel connects the steam inlet with the receiving space. The second channel windingly connects the steam outlet with the receiving space. The condenser includes a condensing channel inlet and a condensing channel outlet. The condenser further includes a condensing channel windingly connecting the condensing channel inlet with the condensing channel outlet. The steam outlet 11b intercommunicates with the condensing channel inlet.

The steam inlet and the steam outlet can be located adjacent to an upper edge of the chip body, and the receiving space can be located adjacent to a lower edge of the chip body.

The micro channel can include a protrusion located in the second channel. The protrusion extends in a direction from the upper edge towards the lower edge of the chip body.

The condenser can further include a conducting member aligned with the condensing channel and made of a material of high thermal conductivity.

The microfluidic chip for steam distillation can further include a cooler coupled to the condenser. The conducting member is sandwiched between the cooler and the condenser.

The cooler can include a cooling channel. A cooling channel inlet and a cooling channel outlet are respectively formed in two opposite ends of the cooling channel. The cooling channel windingly connects the cooling channel inlet with the cooling channel outlet.

The microfluidic chip for steam distillation according to the present invention utilizes the miniaturized chip body and the miniaturized condenser requiring only a small amount of sample solution to efficiently achieve purification and absorption of the volatile component from the small amount of sample solution, increasing convenience to steam distillation and saving the time required for subsequent detection.

Furthermore, the microfluidic chip for steam distillation according to the present invention utilizes the miniaturized chip body and the miniaturized condenser to avoid troubles in assembly and storage of conventional bulky devices, reducing the component costs and increasing utility.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

DETAILED DESCRIPTION OF THE INVENTION

Figure 1:
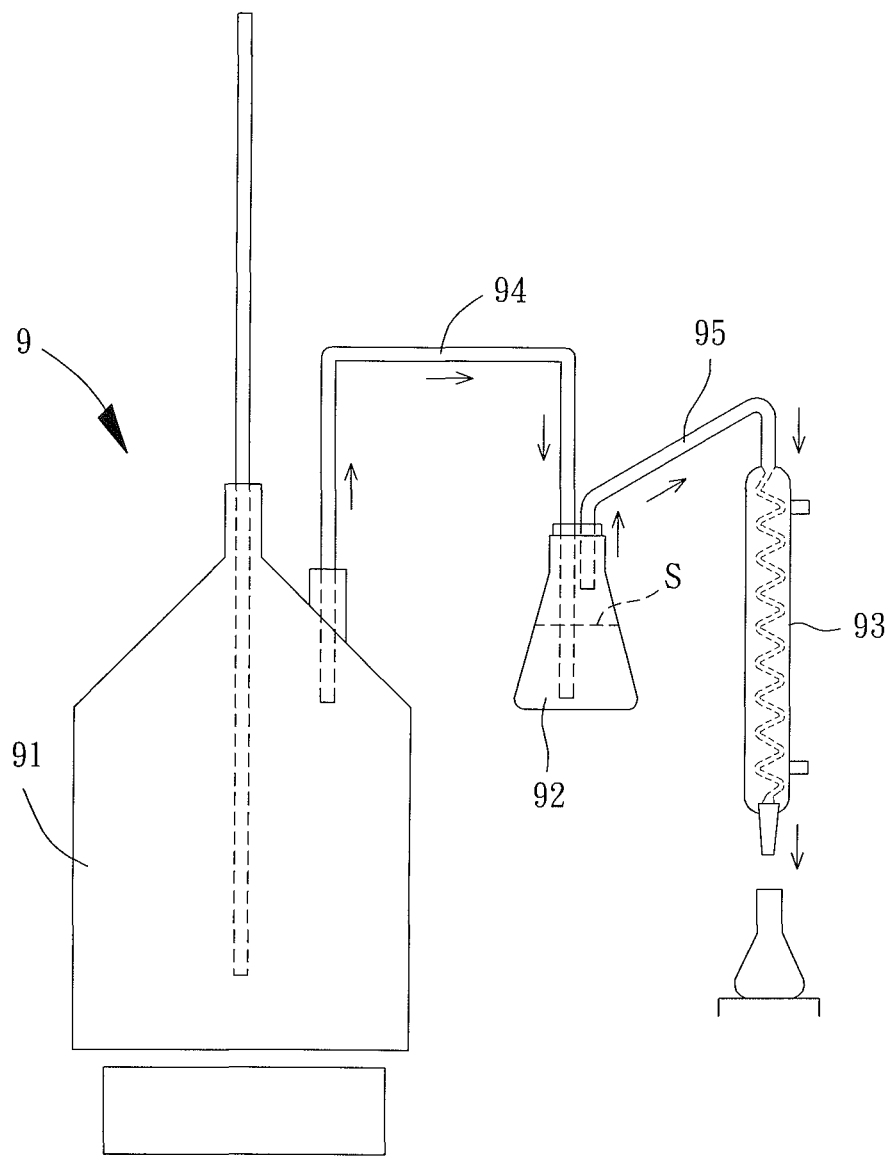
FIG. 1 is a diagrammatic view of a conventional steam distillation device.
Figure 2:
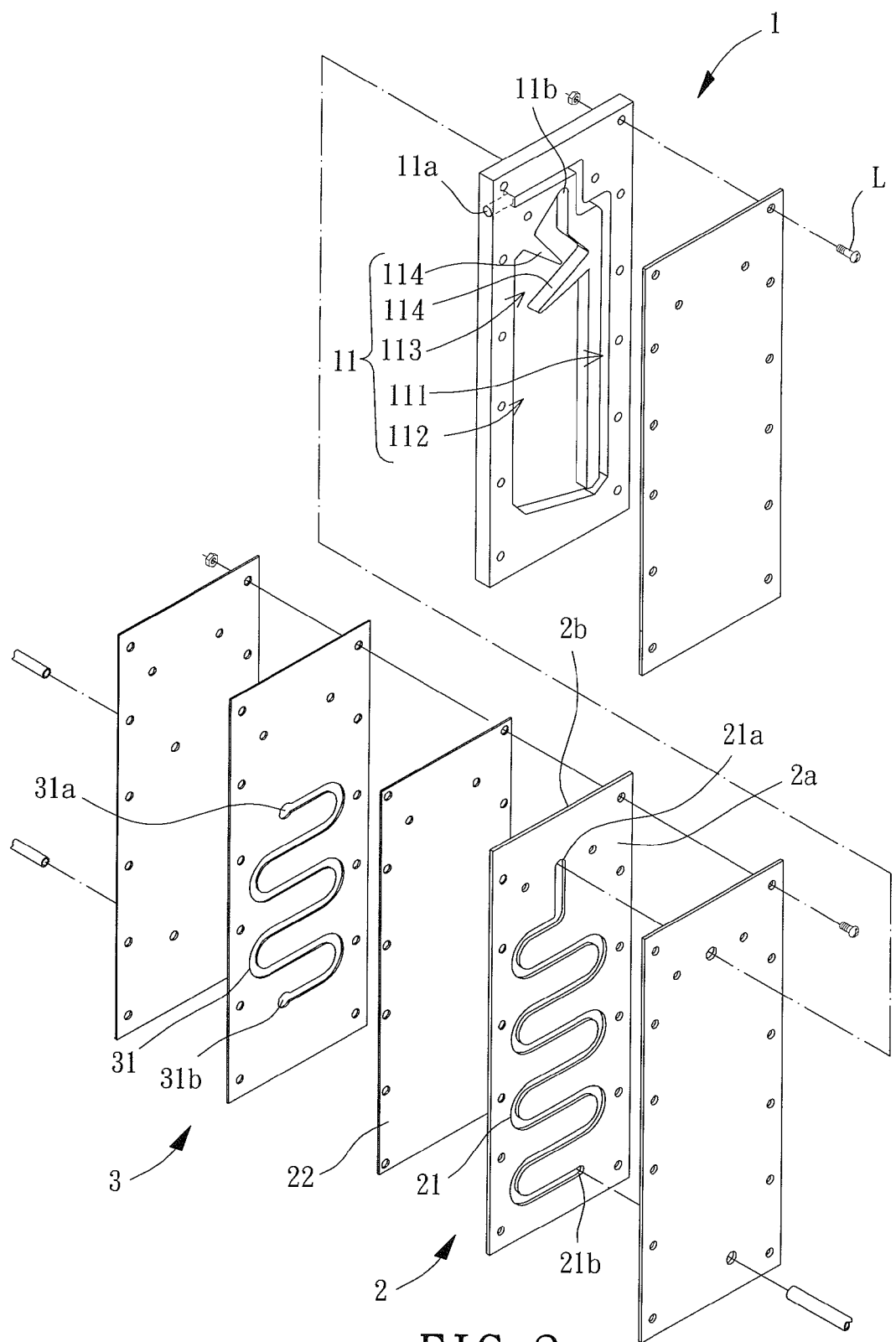
FIG. 2 is an exploded, perspective view of a microfluidic chip for steam distillation microfluidic of a first embodiment according to the present invention.
Figure 3:
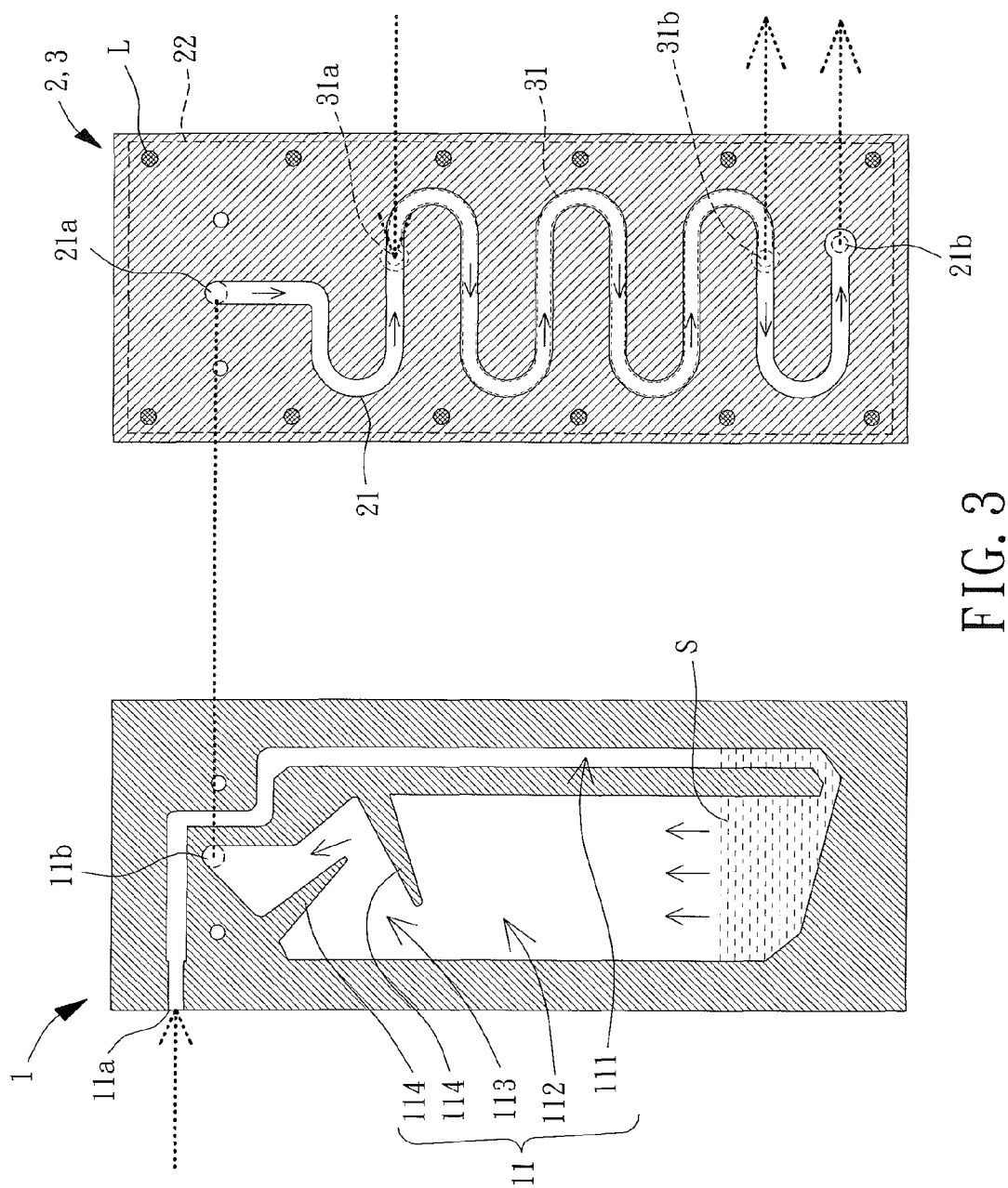
FIG. 3 is diagrammatic view illustrating flow of steam during operation of the microfluidic chip for steam distillation of the first embodiment according to the present invention.

FIGS. 2 and 3 show a microfluidic chip for steam distillation of a first embodiment according to the present invention. The microfluidic chip for steam distillation includes a chip body 1 and a condenser 2. The chip body 1 and the condenser 2 can be coupled to each other or can intercommunicate with each other by a tube such that a gaseous analyte flowing out of the chip body 1 can flow into the condenser 2. The gaseous analyte condenses into a liquid analyte when the temperature of the gaseous analyte is lowered to be below its condensing point. However, the present invention is not limited to this.

The chip body 1 includes a micro channel 11. A steam inlet 11a and a steam outlet 11b are respectively formed in two opposite ends of the micro channel 11. The micro channel 111 includes a first channel 111, a second channel 113, and a receiving space 112 having an enlarged cross sectional area larger than a cross sectional area of each of the first and second channels 111 and 113. The first channel 111 connects the steam inlet 11a with the receiving space 112. The second channel 113 windingly connects the steam outlet 11b with the receiving space 112. Thus, a sample solution S can be placed in the receiving space 112. High temperature steam can flow from the steam inlet 11a into the micro channel 11 and then flow through the first channel 111 into the receiving space 112. The sample solution S in the receiving space 112 is heated by the high temperature steam and turns into a gaseous analyte that is pushed by the high temperature steam to flow along the second channel 113 towards the steam outlet 11b.

Preferably, the micro channel 11 includes a protrusion 114 located in the second channel 113 to stop the gaseous analyte from directly flowing towards, the steam outlet 11b. With reference to FIG. 3, the protrusion 114 preferably extends in a direction from an upper edge towards a lower edge of the chip body 1. Thus, if the gaseous analyte which has not yet flowed outside via the steam outlet 11b is exposed to cold and condenses into the sample solution S, the sample solution S can flow along the protrusion 114 into the receiving space 112 and, hence, can be heated by the high temperature steam again.

Preferably, the steam inlet 11a and the steam outlet 11b are located adjacent to the upper edge of the chip body 1, and the receiving space 112 is located adjacent to a lower edge of the chip body 1. This prevents the sample solution S in the receiving space 112 from flowing outside via the steam inlet 11a or the steam outlet 11b, assuring that only the gaseous analyte heated by the high temperature steam can flow outside via the steam outlet 11b.

In this embodiment, the chip body 1 is preferably made of polymethyl methacrylate (PMMA, also referred to as "acrylic") and can be processed by laser processing to form the micro channel 11 in the chip body 1. Furthermore, the size of the chip body 1 can be varied according to the user needs. In this embodiment, an acrylic board of 6 cm (width)×1.5 cm (length)×0.6 cm (thickness) is processed by laser processing to form the micro channel 11, and an acrylic sheet of the same width and length but having a thickness of 0.15 cm is coupled to the acrylic board with the micro channel 11 by hot pressing to form the chip body 1 of this embodiment.

With reference to FIGS. 2 and 3, the condenser 2 includes two opposite faces 2a and 2b. The condenser 2 further includes a condensing channel 21. Preferably, the condensing channel 21 is located adjacent to the face 2a. A condensing channel inlet 21a and a condensing channel outlet 21b are respectively formed in two opposite ends of the condensing channel 21. The condensing channel 21 windingly connects the condensing channel inlet 21a with the condensing channel outlet 21b. The condensing channel inlet 21a intercommunicates with the steam outlet 11b. Thus, the gaseous analyte flowing out of the steam outlet 11b can enter the condensing channel 21 via the condensing channel inlet 21a and can lower its temperature in the condensing channel 21 to condense into the liquid analyte which is then discharged via the condensing channel outlet 21b. Preferably, the condensing channel inlet 21a is located adjacent to an upper edge of the condenser 2, and the condensing channel outlet 21b is located adjacent to a lower edge of the condenser 2, such that the liquid analyte condensed in the condensing channel 21 can smoothly be discharged.

Preferably, the condenser 2 further includes a conducting member 22 abutting the face 2b of the condenser 2. The conducting member 22 is aligned with the condensing channel 21 of the condenser 2 and is made of a material of high thermal conductivity, such as aluminum, copper, silver, etc.

In this embodiment, the condenser 2 is also made of PMMA and is processed by laser processing to form the condensing channel 21 in the condenser 2. Furthermore, the size of the condenser 2 preferably matches with the chip body 1. In this embodiment, an acrylic board of 6 cm (width)×1.5 cm (length)×0.6 cm (thickness) is processed by laser processing to form the condensing channel 21 in a face (see face 21a), and the face 21a is covered by an acrylic sheet of the same size in width, length, and thickness that is coupled to the acrylic board with the condensing channel 21 by hot pressing to form the condenser 2 of this embodiment.

Furthermore, the microfluidic chip for steam distillation of this embodiment can further include a cooler 3 coupled to the face 2b of the condenser 2. The conducting member 22 is sandwiched between the cooler 3 and the condenser 2. Thus, the heat of the gaseous analyte flowing through the condensing channel 21 can rapidly be carried away such that the temperature of the gaseous analyte can rapidly be lowered to be below the condensing point in which the gaseous analyte can condense into liquid droplets (the above-mentioned liquid analyte). The cooler 3 can be connected to a cooling fan (not shown) for rapidly carrying away the heat of the gaseous analyte.

In this embodiment, the cooler 3 includes a cooling channel 31. A cooling channel inlet 31a and a cooling channel outlet 31b are respectively formed in two opposite ends of the cooling channel 31. The cooling channel 31b windingly connects the cooling channel inlet 31a with the cooling channel outlet 31b. Preferably, the cooling channel 31 is aligned with the conducting member 22 of the condenser 2. Thus, cooling water can flow through the cooling channel inlet 31a into the cooling channel 31 to carry away the heat of the gaseous analyte flowing through the condensing channel 21. The cooling water carrying the heat can be discharged via the cooling channel outlet 31b.

In this embodiment, the cooler 3 is also made of PMMA and is processed by laser processing to form the cooling channel 31. Furthermore, the size of cooler 3 preferably matches with the chip body 1. In this embodiment, an acrylic board of 6 cm (width)×1.2 cm (length)×0.15 cm (thickness) is processed by laser processing to form the cooling channel 31 and is then coupled to the condenser 2 by hot pressing. An acrylic sheet of the same size in width, length, and thickness is coupled to the acrylic board with the cooling channel 31 by hot pressing.

Furthermore, to permit stable assembly of the microfluidic chip for steam distillation of the embodiment according to the present invention, fixing holes can be formed in the acrylic board and the acrylic sheet of the chip body 1 and the acrylic boards and the acrylic sheet of the condenser 2 and the cooler 3 in corresponding locations, and fasteners L can extend through the fixing holes for fixing purposes after the acrylic board and the acrylic sheet of the chip body 1 have coupled to the acrylic boards and the acrylic sheet of the condenser 2 and the cooler 3.

Figure 4:
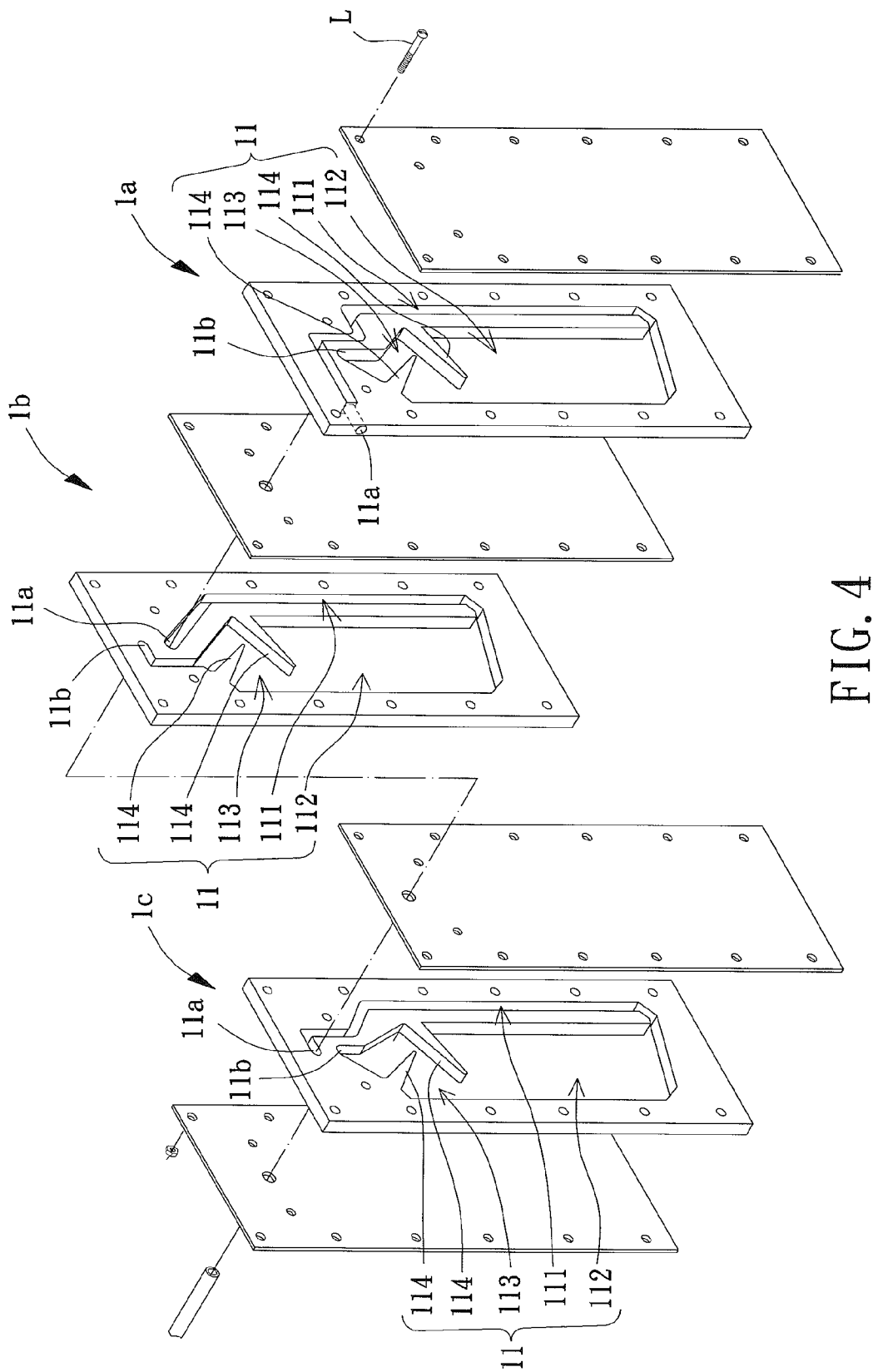
FIG. 4 is an exploded, perspective view of a microfluidic chip for steam distillation of a second embodiment according to the present invention.
Figure 5:
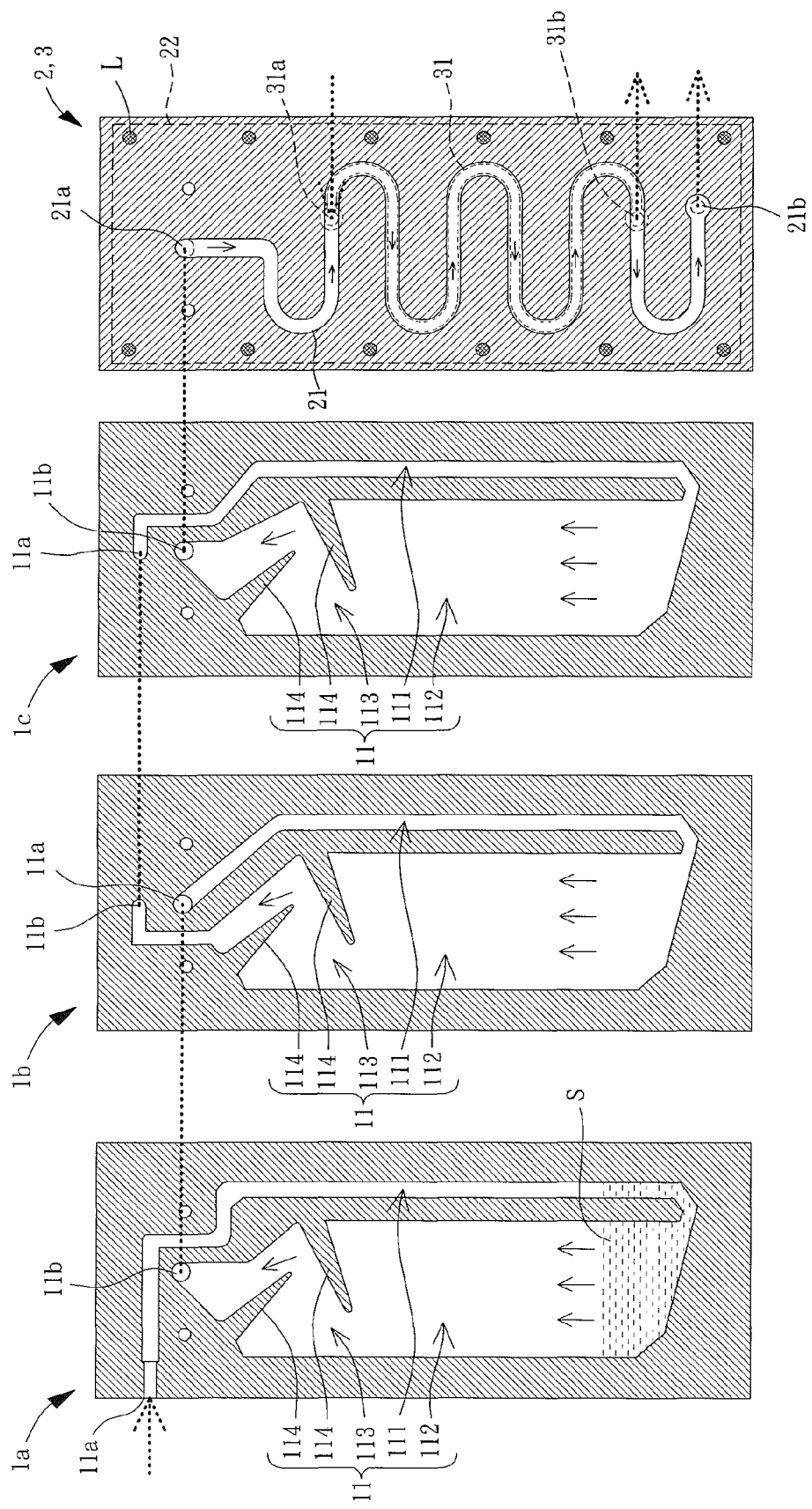
FIG. 5 is diagrammatic view illustrating flow of steam during operation of the microfluidic chip for steam distillation of the second embodiment according to the present invention.

FIGS. 4 and 5 show a microfluidic chip for steam distillation of a second embodiment according to the present invention. In this embodiment, the chip body 1 is comprised of three acrylic boards each having a micro channel 11 and a thickness of 0.6 cm (these three acrylic boards will hereinafter be referred to as "chip bodies 1a, 1b, and 1c"). An acrylic sheet having a thickness of 0.15 cm is mounted between two adjacent acrylic boards. The micro channels 11 can only be intercommunicated with each other by the steam inlets 11a and the steam outlets 11b. Thus, the overall length of the micro channels 11 can significantly be increased to increase the steam distillation efficiency of the chip body 1.

With reference to FIG. 5, in operation of the microfluidic chip for steam distillation of the second embodiment according to the present invention, the sample solution S is placed in the receiving space 112 of the chip body 1a, and high temperature steam enters via the steam inlet 11a of the chip body 1a to heat the sample solution S in the receiving space 112. The sample solution S turns into a gaseous analyte which is pushed by the high temperature steam to flow towards the steam outlet 11b of the chip body 1a and enter the chip body 1b. The gaseous analyte is further pushed by the high temperature steam to flow from the chip body 1b into the chip body 1c and finally flows out of the steam outlet 11b of the chip body 1c into the condensing channel 21 of the condenser 2. The heat of the gaseous analyte is carried away by the cooler 3 and, thus, condenses into a liquid analyte at the condensing channel outlet 21b of the condensing channel 21, which is advantageous to subsequent detection of the liquid analyte.

Tests were conducted to prove that the microfluidic chip for steam distillation of the embodiments according to the present invention could effectively separate methanol from the sample solution S.

A. Methanol Recovery Test

This test used methanol solutions respectively having methanol concentrations of 2, 4, 6, 8, and 10 ppm as standard solutions. After measuring the absorbance values at the wavelength of 425 nm, the relation between the methanol solution concentrations and the absorbance values was depicted as a standard curve whose trend line equation is $Y=0.10108X+0.00484$, wherein $R^2$ is equal to 0.9991.

2 g of a sample solution S (containing 100 ppm of methanol) was prepared and tested by the microfluidic chip for steam distillation of the second embodiment according to the present invention. 20 mL of liquid analyte was collected at the condensing channel outlet 21b. The absorbance value at 425 nm wavelength was tested. This test was repeated five times, and the average absorbance value was 0.929.

The above absorbance value was substituted into the trend line equation, and X was determined 9.143 after calculation. The volume of the liquid analyte was 10 times the volume of the sample solution S. Thus, the methanol concentration of the sample solution S would be 91.42 ppm. Namely, the methanol recovery rate of the microfluidic chip for steam distillation of the embodiment according to the present invention was 91.43%.

B. Detection of Methanol Concentration in Foods in the Market

The foods in this test were listed in Table 1. After steam distillation by the microfluidic chip for steam distillation of the second embodiment according to the present invention, the methanol concentrations of the foods were shown in Table 1. A conventional steam distillation device was used by the Center for Agricultural and Aquacultural Product Inspection and Certification (CAAPIC) of Taiwan National Pingtung University of Science and Technology to detect the methanol concentration of the foods in the market according to the Food Regulation Nos. 0900025822 and 0900018531 of the Taiwan Health Bureau.

TABLE 1

| | | methanol concentration (ppm) | | |
| --- | --- | --- | --- | --- |
| group | item | microfluidic chip of the invention | conventional steam distillation device | error (%) |
| B1 | Korean ginseng tea | 12.94 | 14.55 | 11.06% |
| B2 | essence of red ginseng | 7.57 | 6.62 | 12.55% |
| B3 | American ginseng | 10.64 | 11.45 | 7.07% |
| B4 | dried mushroom | 65.83 | 61.41 | 6.71% |

As can be seen from Table 1, the microfluidic chip for steam distillation of the embodiment according to the present invention could extract methanol from the foods in the market, and the concentration error was within 5 ppm in comparison with the test results of the Center for Agricultural and Aquacultural Product Inspection and Certification (CAAPIC) of Taiwan National Pingtung University of Science and Technology.

In view of the foregoing, the microfluidic chip for steam distillation according to the present invention utilizes the miniaturized chip body 1 and the miniaturized condenser 2 requiring only a small amount of sample solution S to efficiently achieve purification and absorption of the volatile component from the small amount of sample solution S, increasing convenience to steam distillation and saving the time required for subsequent detection.

Furthermore, the microfluidic chip for steam distillation according to the present invention utilizes the miniaturized chip body 1 and the miniaturized condenser 2 to avoid troubles in assembly and storage of conventional bulky devices, reducing the component costs and increasing utility.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A microfluidic chip for steam distillation comprising:
a chip body including a steam inlet and a steam outlet, with the steam inlet connected to the steam outlet by a micro channel, with the micro channel including a first channel, a second channel, and a receiving space having an enlarged cross sectional area larger than a cross sectional area of each of the first and second channels, with the first channel connecting the steam inlet with the receiving space, and with the second channel windingly connecting the steam outlet with the receiving space; and
a condenser including a condensing channel inlet and a condensing channel outlet, with the condenser further including a condensing channel windingly connecting the condensing channel inlet with the condensing channel outlet, and with the steam outlet intercommunicated with the condensing channel inlet.

2. The microfluidic chip for steam distillation as claimed in claim 1, with the steam inlet and the steam outlet located adjacent to an upper edge of the chip body, and with the receiving space located adjacent to a lower edge of the chip body.

3. The microfluidic chip for steam distillation as claimed in claim 2, with the micro channel including a protrusion located in the second channel, and with the protrusion extending in a direction from the upper edge towards the lower edge of the chip body.

4. The microfluidic chip for steam distillation as claimed in claim 1, with the condenser further including a conducting member, with the conducting member aligned with the condensing channel and made of aluminum, copper, or silver.

5. The microfluidic chip for steam distillation as claimed in claim 4, further comprising: a cooler coupled to the condenser, with the conducting member sandwiched between the cooler and the condenser.

6. The microfluidic chip for steam distillation as claimed in claim 5, with the cooler including a cooling channel, with a cooling channel inlet and a cooling channel outlet respectively formed in two opposite ends of the cooling channel, and with the cooling channel windingly connecting the cooling channel inlet with the cooling channel outlet.

* * * * *